(12) United States Patent
Shiohara et al.

(10) Patent No.: US 11,549,252 B2
(45) Date of Patent: Jan. 10, 2023

(54) FLUSH TOILET

(71) Applicant: TOTO LTD., Kitakyushu (JP)

(72) Inventors: Eiji Shiohara, Fukuoka (JP); Yusuke Tone, Fukuoka (JP); Masaaki Momoe, Fukuoka (JP); Kazuya Esaki, Fukuoka (JP); Masaki Mori, Fukuoka (JP)

(73) Assignee: TOTO LTD., Kitakyushu (JP)

( * ) Notice: Subject to any disclaimer, the term of this patent is extended or adjusted under 35 U.S.C. 154(b) by 0 days.

(21) Appl. No.: 17/591,775

(22) Filed: Feb. 3, 2022

(65) Prior Publication Data

US 2022/0316197 A1  Oct. 6, 2022

(30) Foreign Application Priority Data

Mar. 30, 2021 (JP) .............................. JP2021-057578

(51) Int. Cl.
*E03D 11/02* (2006.01)

(52) U.S. Cl.
CPC .................... *E03D 11/02* (2013.01)

(58) Field of Classification Search
CPC .................................. E03D 9/08; E03D 11/02
See application file for complete search history.

(56) References Cited

U.S. PATENT DOCUMENTS

2019/0257065 A1* 8/2019 Schibur ................... E03D 11/13

FOREIGN PATENT DOCUMENTS

| EP | 3299527 A1 * | 3/2018 | ............... E03D 9/08 |
| JP | 2020-165173 | 10/2020 | |

* cited by examiner

*Primary Examiner* — Janie M Loeppke
(74) *Attorney, Agent, or Firm* — Amin, Turocy & Watson, LLP

(57) ABSTRACT

There are included a toilet body including a bowl part that receives waste; a function unit that is arranged in a rear portion of the toilet body; a panel member that covers a side surface of the function unit; a magnet that is provided to the panel member; and a magnetic material that is provided to an attachment part of the toilet body, wherein the magnetic material is elastically deformable, and is attached to the attachment part to put the attachment part therebetween.

6 Claims, 9 Drawing Sheets

FIG.7
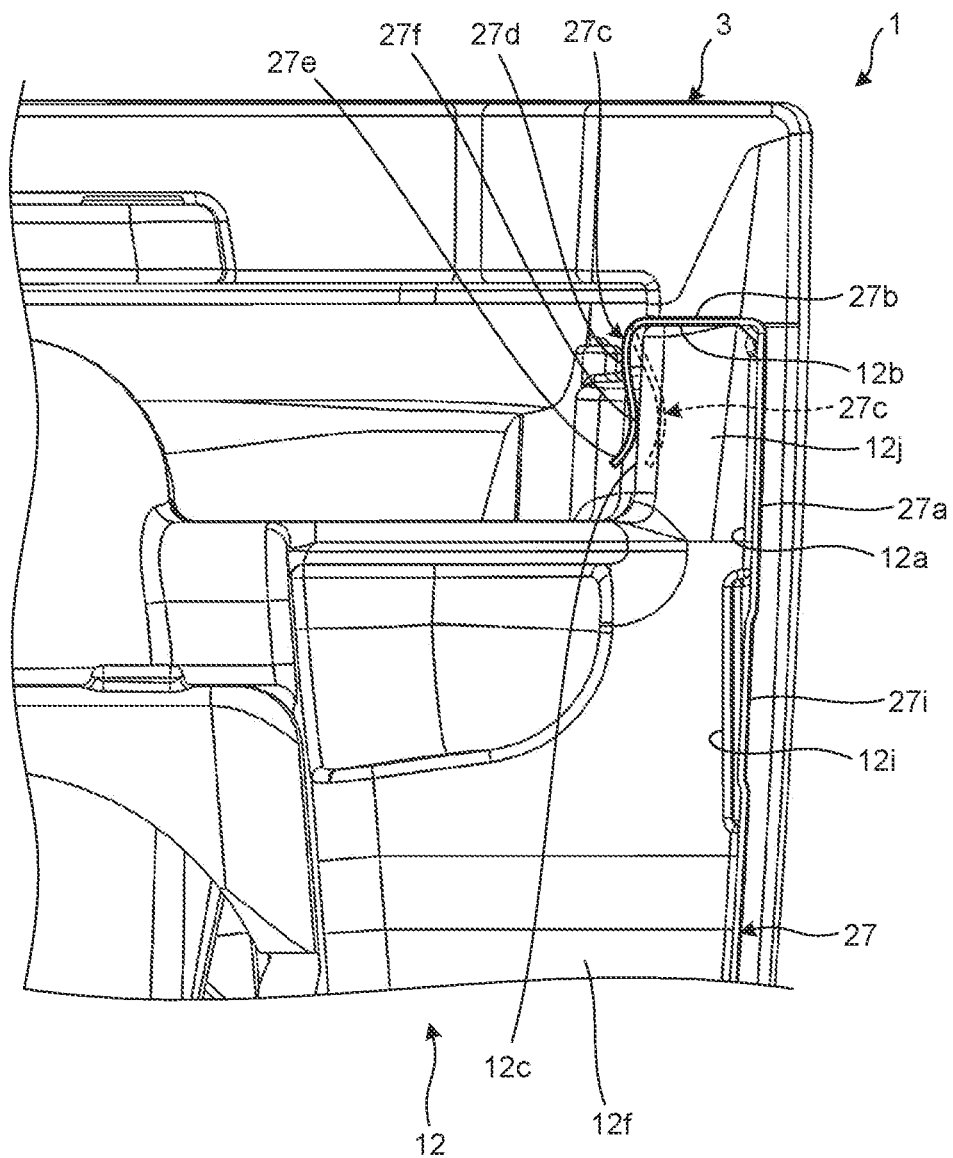
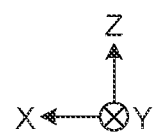

FLUSH TOILET

CROSS-REFERENCE TO RELATED APPLICATION(S)

The present application claims priority to and incorporates by reference the entire contents of Japanese Patent Application No. 2021-057578 filed in Japan on Mar. 30, 2021.

FIELD

Embodiments of the disclosure relate to a flush toilet.

BACKGROUND

Conventionally, with respect to a flush toilet in which a function unit is covered with a panel member, there has been known a flush toilet in which a panel member and a toilet body are held to each other by magnetic force (see Japanese Laid-open Patent Publication No. 2020-165173, for example).

As disclosed in Japanese Laid-open Patent Publication No. 2020-165173, in a case where a magnet or a magnetic material is attached to a toilet body that is made of pottery, adhesive agent is commonly used. However, in the method for using adhesive agent, there presents problem that the number of working processes is large and/or there presents problem in workability that correction is difficult.

SUMMARY

A flush toilet according to one aspect of embodiments includes: a toilet body including a bowl part that receives waste; a function unit that is arranged in a rear portion of the toilet body; a panel member that covers a side surface of the function unit; a magnet that is provided to the panel member; and a magnetic material that is provided to an attachment part of the toilet body, wherein the magnetic material is elastically deformable, and is attached to the attachment part to put the attachment part therebetween.

The above and other objects, features, advantages and technical and industrial significance of this invention will be better understood by reading the following detailed description of presently preferred embodiments of the invention, when considered in connection with the accompanying drawings.

BRIEF DESCRIPTION OF DRAWING(S)

FIG. 2 is a side view illustrating the flush toilet according to the embodiment while omitting a part of a panel member and the like;

FIG. 4 is a rear perspective view illustrating the flush toilet according to the embodiment while omitting the panel member and the like;

FIG. 5 is a rear view illustrating the flush toilet according to the embodiment while omitting the panel member and the like;

FIG. 7 is a rear view illustrating the sheet metal and an upper portion of an attachment part in the flush toilet according to the embodiment;

DESCRIPTION OF EMBODIMENT(S)

Hereinafter, the outline of a flush toilet 1 according to an embodiment will be explained with reference to the accompanying drawings.

Figure 1:
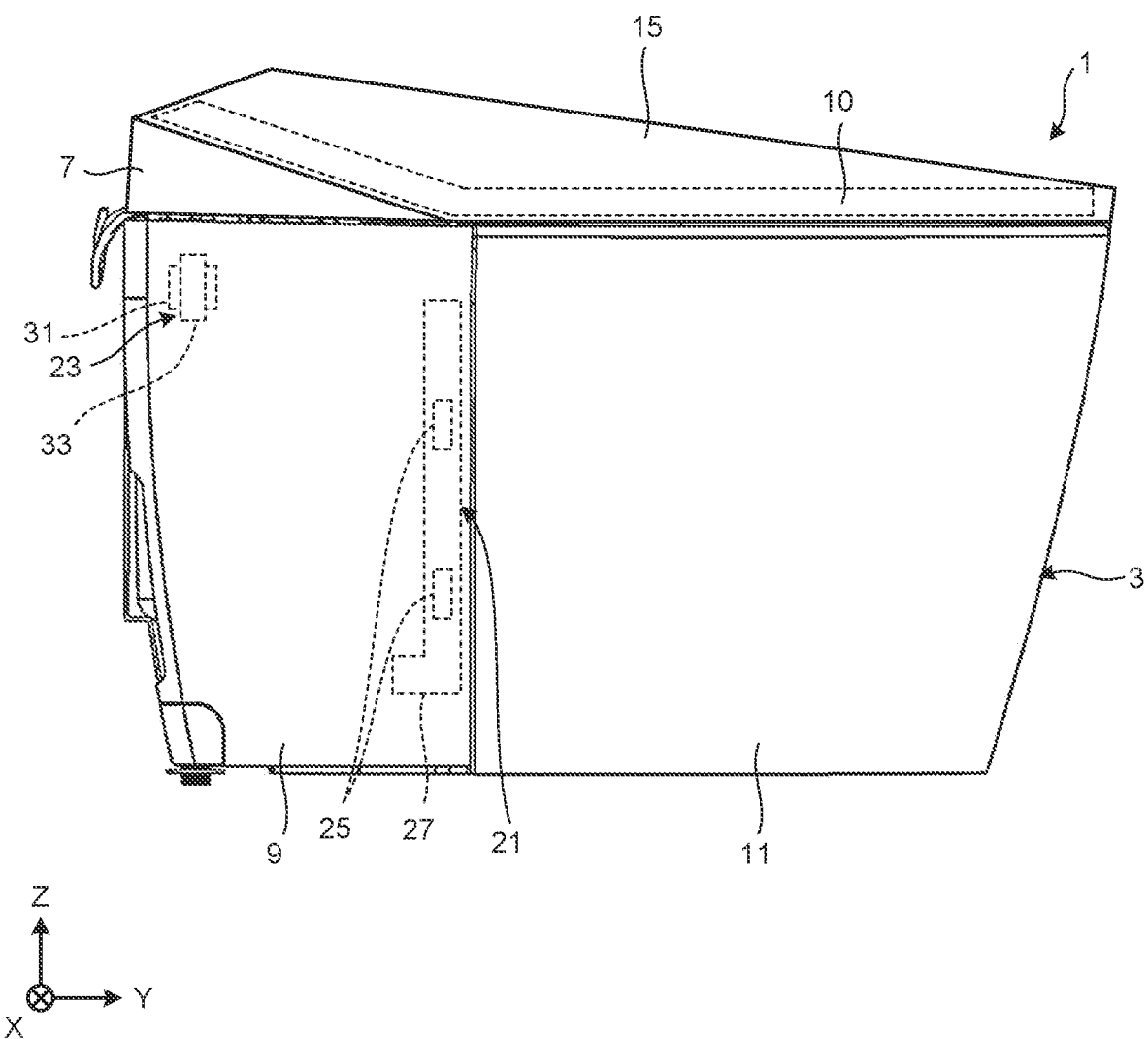
FIG. 1 is a side view illustrating a flush toilet according to an embodiment.

In the accompanying drawings including FIG. 1, there is illustrated a three-dimensional orthogonal coordinate system that includes a Z-axis with a positive direction being a vertically upward direction for readily understanding an explanation. In this case, a positive direction of an X-axis is prescribed as a leftward direction, a negative direction of the X-axis is prescribed as a rightward direction, a positive direction of a Y-axis is prescribed as a forward direction, a negative direction of the Y-axis is prescribed as a backward direction, a positive direction of a Z-axis is prescribed as an upward direction, a negative direction of the Z-axis is prescribed as a downward direction, and a X-axis direction, a Y-axis direction, and a Z-axis direction may be respectively referred to as a left-right direction, a front-back direction, and an up-and-down direction. Note that the left-right direction is corresponding to a width direction of the flush toilet 1.

Figure 2:
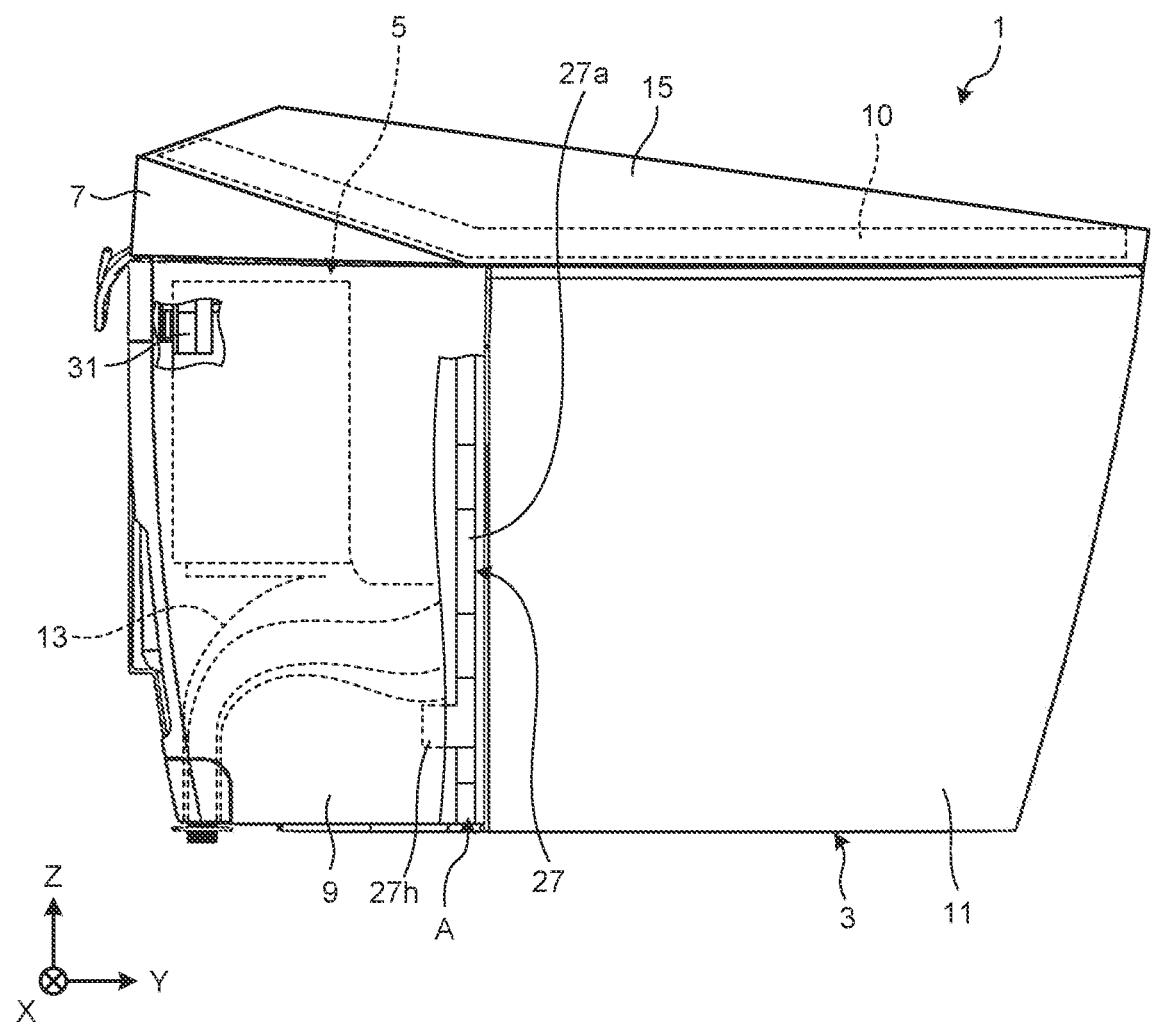

As illustrated in FIGS. 1 and 2, the flush toilet 1 includes a toilet body 3, a function unit 5, a sanitary washing device 7, a panel member 9, a toilet seat part 10, and a lid part 15. The toilet body 3 is made of pottery. The toilet body 3 may be made of, not limited to pottery, resin or a combination of pottery and resin. FIG. 1 is a side view illustrating the flush toilet 1 according to the embodiment. FIG. 2 is a side view illustrating the flush toilet 1 according to the embodiment while omitting a part of the panel member 9 and the like.

The toilet body 3 includes a bowl part 4 (see FIG. 4), a peripheral portion 11, and a drainage water trap pipeline 13.

The function unit 5 is arranged in the rear of the toilet body 3. The function unit 5 supplies water to the bowl part 4 of the toilet body 3 and the sanitary washing device 7. The function unit 5 includes a water storage tank (not illustrated), a pressure pump (not illustrated), and the like. In supplying water, the function unit 5 pressurizes flush water stored in the water storage tank by using the pressure pump so as to spout the water from a jet water spout port (not illustrated) toward the bowl part 4 with a large flow volume.

The sanitary washing device 7 is provided with a private part washing device (not illustrated) including a nozzle device (not illustrated) that ejects washing water toward a private part of a user above the bowl part 4. Moreover, the sanitary washing device 7 is provided with a water storing part (not illustrated) that stores therein washing water to be supplied to the private part washing device, a heater (not illustrated) that warms washing water in the water storing part to an appropriate temperature so as to obtain warm water, a ventilation fan (not illustrated), a deodorizing fan (not illustrated), a warm air fan (not illustrated), a control unit (not illustrated) that controls these devices, and the like.

The bowl part 4 is a part that receives waste, and is concavely formed. A rim part 6 (see FIG. 4) is formed in an upper peripheral portion of the bowl part 4. The rim part 6 includes a rim water spout port 8 (see FIG. 4) that spouts flush water. In the rim part 6, flush water spouted from the rim water spout port 8 flows along an upper peripheral portion of the bowl part 4 so as to form a swirling flow in the bowl part 4. The rim water spout port 8 is connected to a water guide channel (not illustrated) that is formed on an upstream side, and flush water from a flush water supplying pipe (not illustrated) is supplied thereto via the water guide channel.

In the rear of the toilet body 3 and on a side surface of the function unit 5, the panel member 9 is arranged for preventing an external interference and penetration of wastewater to the function unit 5. The panel member 9 is made of resin.

The toilet seat part 10 is arranged in an upper part of the toilet body 3, and a user sits thereon when using the flush toilet 1. The toilet seat part 10 rotates while using a rear portion thereof as a pivot point to be openable and closable.

Similarly to the toilet seat part 10, the lid part 15 is arranged in an upper part of the toilet body 3, and covers an upper surface including the bowl part 4 of the toilet body 3 from above. Similarly to the toilet seat part 10, the lid part 15 rotates while using a rear portion thereof as a pivot point to be openable and closable. In a closed state, the lid part 15 covers an upper surface of the toilet body 3 from above, and further covers the toilet seat part 10 from above.

The flush toilet 1 includes a first holding part 21 and a second holding part 23. The first holding part 21 attracts and holds a side surface of the panel member 9 and the toilet body 3 by magnetic force, and the second holding part 23 attracts and holds the function unit 5 and a side surface of the panel member 9 by magnetic force. The second holding part 23 is constituted of a magnet 33 that is arranged on a side surface of the panel member 9, and a sheet metal 31 that is provided to the function unit 5 and is a magnetic material to be attracted by magnetic force.

Hereinafter, the first holding part 21 will be specifically explained. The first holding part 21 is constituted of magnets 25 and a sheet metal 27 that is a magnetic material to be attracted by magnetic force. The first holding part 21 is arranged in a boundary portion A between the toilet body 3 and the panel member 9. The boundary portion A indicates a part where the toilet body 3 and the panel member 9 overlap with each other when the panel member 9 is appropriately arranged to the toilet body 3. The boundary portion A indicates a part where, in a side view of the toilet body 3, a side surface whose curvature loosely changes from the front of the toilet body 3 changes at a large curvature in the rear of the toilet body 3, specifically, a part including a level difference that dents toward the inside of the toilet body 3.

Figure 3:
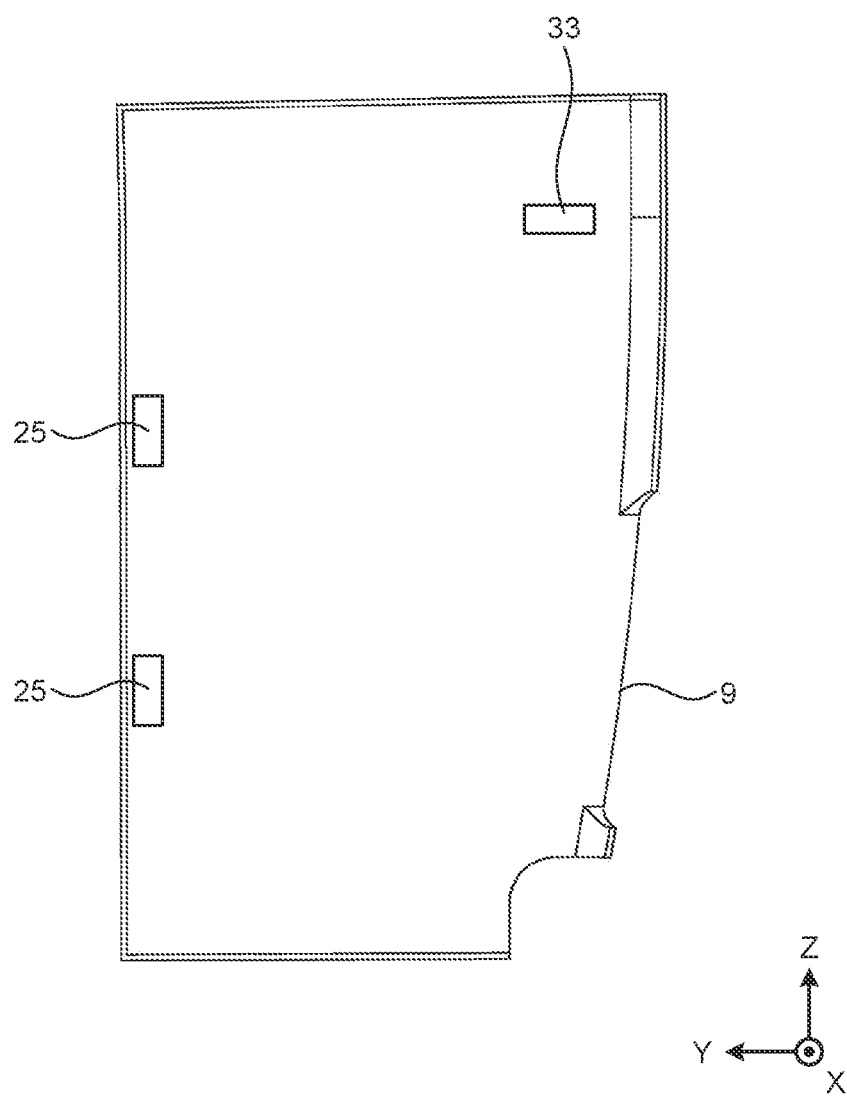
FIG. 3 is a side view illustrating a panel member according to the embodiment viewed from the inside.
Figure 4:
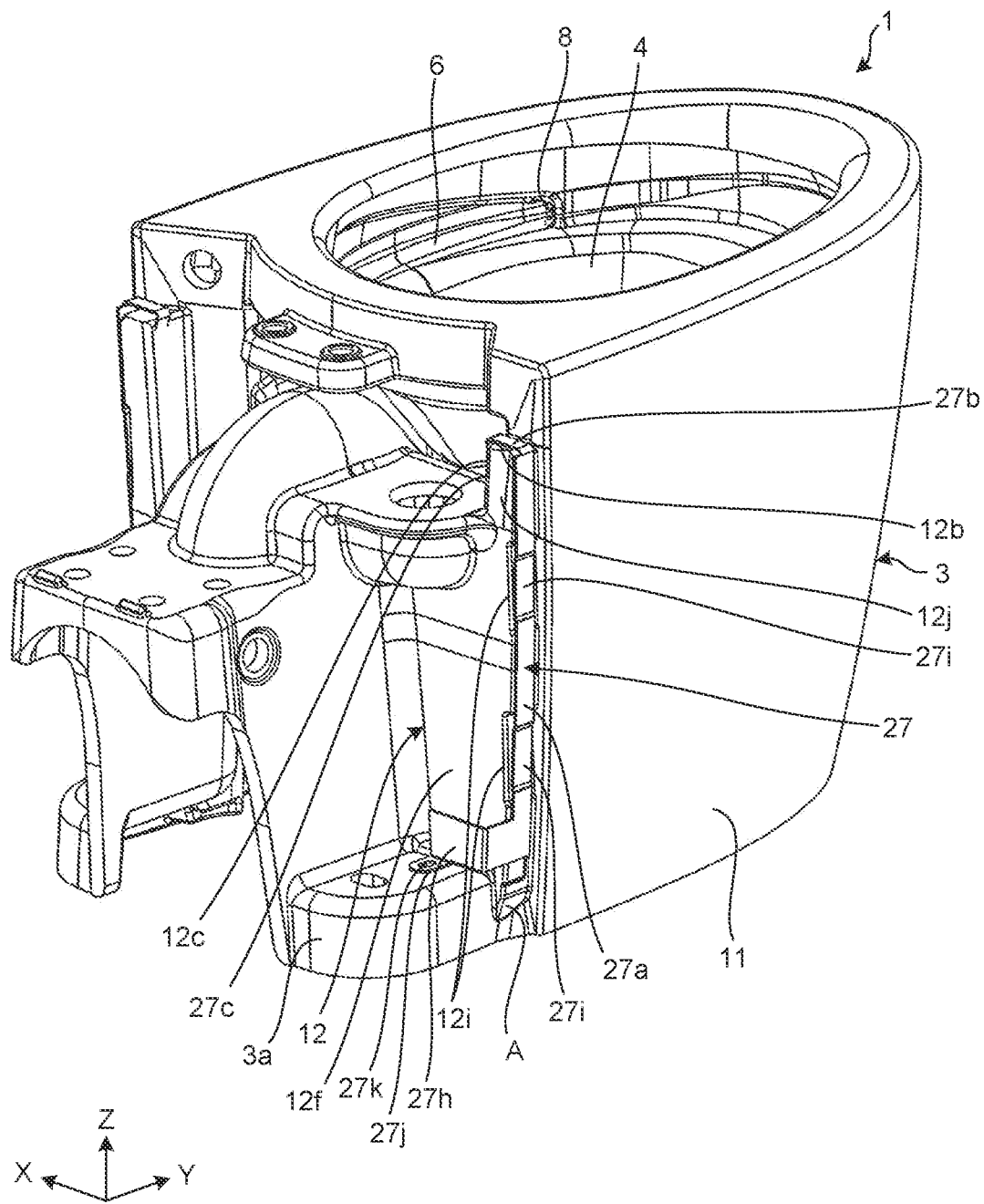
Figure 5:
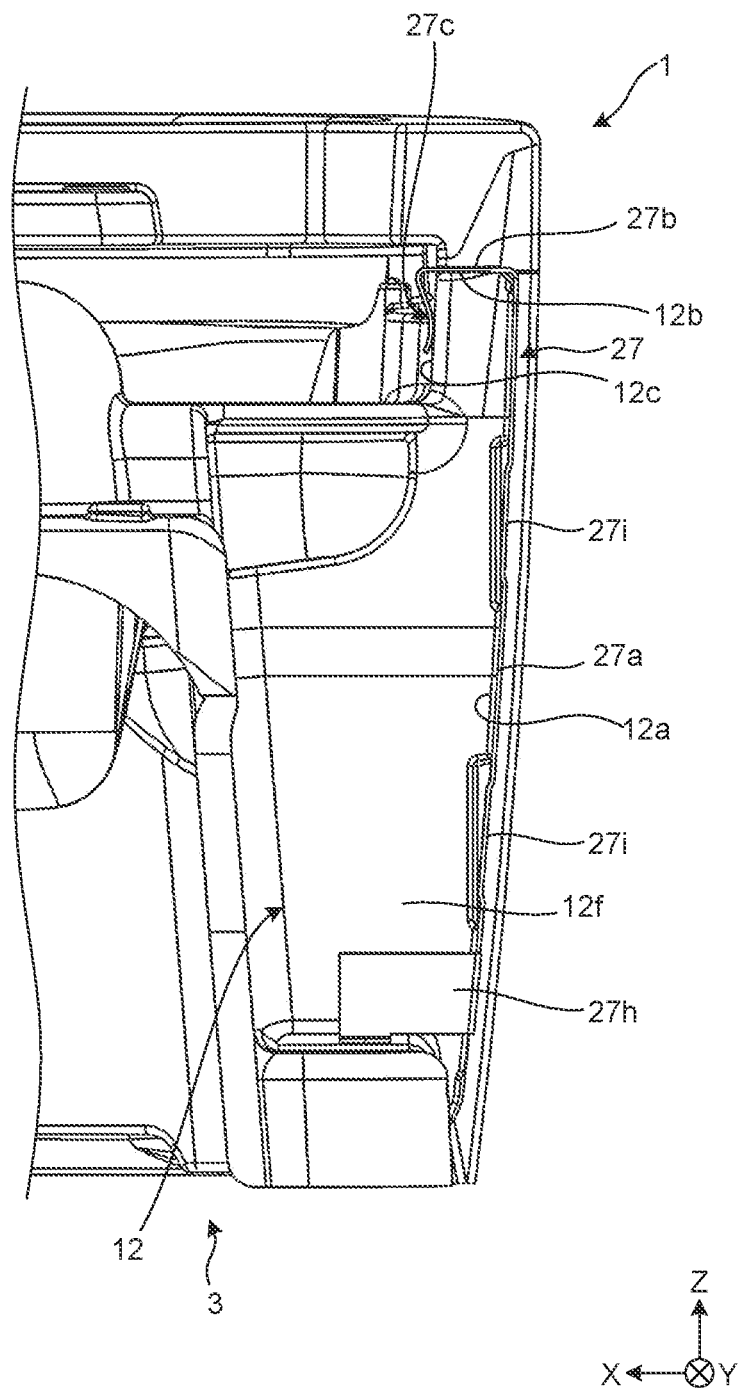
Figure 6:
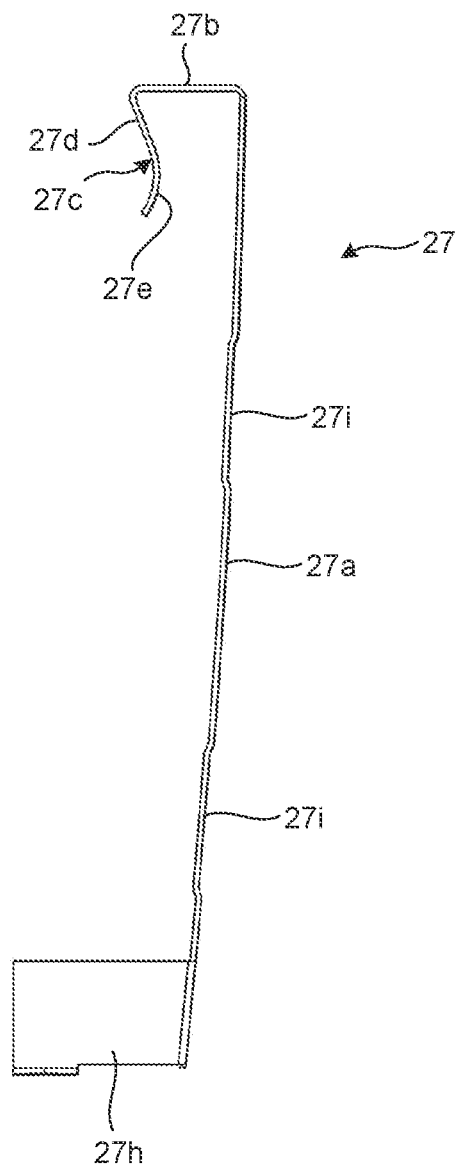
FIG. 6 is a rear view illustrating a sheet metal of the flush toilet according to the embodiment.
Figure 8:
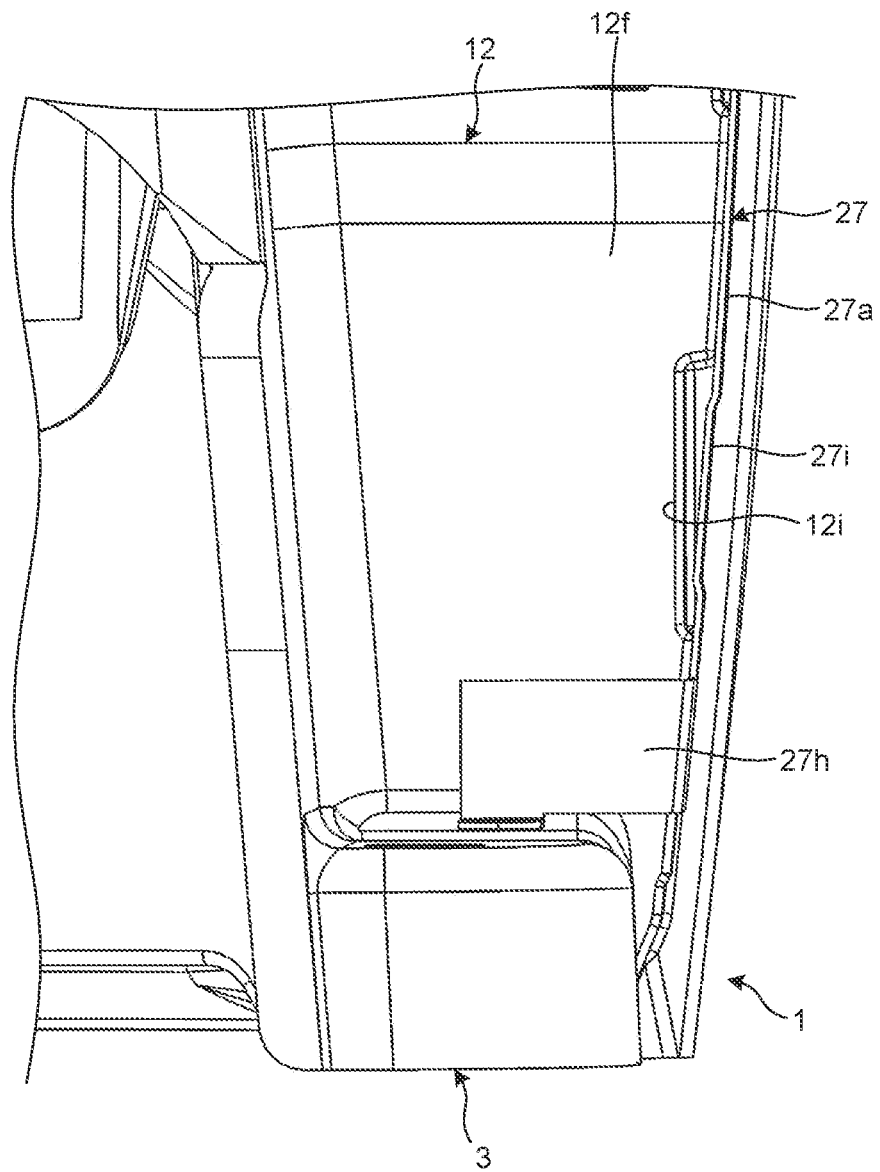
FIG. 8 is a rear view illustrating the sheet metal and a lower portion of the attachment part in the flush toilet according to the embodiment.

Next, with reference to FIGS. 3 to 8, attachment between the sheet metal 27 and an attachment part 12, and attachment between the panel member 9 and the toilet body 3 will be explained. FIG. 3 is a side view illustrating the panel member 9 according to the embodiment viewed from the inside. FIG. 4 is a rear perspective view illustrating the flush toilet 1 according to the embodiment while omitting the panel member 9 and the like. FIG. 5 is a rear view illustrating the flush toilet 1 according to the embodiment while omitting the panel member 9 and the like. FIG. 6 is a rear view illustrating the sheet metal 27 of the flush toilet 1 according to the embodiment. FIG. 7 is a rear view illustrating the sheet metal 27 and an upper portion of the attachment part 12 of the flush toilet 1 according to the embodiment. FIG. 8 is a rear view illustrating the sheet metal 27 and a lower portion of the attachment part 12 of the flush toilet 1 according to the embodiment.

The magnets 25 are attached to the panel member 9. The magnets 25 are arranged at two points in a front edge portion of an inner surface of the panel member 9, namely, near a boundary between the toilet body 3 and the panel member 9. The arrangement in two points of the magnets 25 includes one in an interval between an upper end and the center of the panel member 9 and the other in an interval between a lower end and the center of the panel member 9. The magnets 25 are need not to be arranged at two points, may be arranged to cover whole of the boundary portion A along the up-and-down direction thereof, or may be arranged at a single point at the center of the boundary portion A in the up-and-down direction thereof.

Next, the sheet metal 27 will be explained. The sheet metal 27 is attached to the toilet body 3. The sheet metal 27 is attached to the attachment part 12 of the toilet body 3 in the boundary portion A. The attachment part 12 extends backward from an edge surface of the rear of the peripheral portion 11. The attachment part 12 includes an outer surface 12*a* that extends in the up-and-down direction, an upper surface 12*b* that extends toward the inside from an upper end of the outer surface 12*a*, and an inner surface 12*c* that extends downward from an inside edge of the upper surface 12*b*. In the attachment part 12, a protruding part 12*j* having a predetermined thickness is formed in an upper edge portion thereof between the outer surface 12*a* and the inner surface 12*c*. A connecting part (edge portion) of each of the surfaces has a curvature.

The sheet metal 27 is formed of an elastically deformable thin-plate metal. The sheet metal 27 includes an attraction part 27*a* that extends in the up-and-down direction so as to cover the outer surface 12*a* of the attachment part 12 in a side view, a connecting part 27*b* that extends from an upper end of the attraction part 27*a* toward the inside and that is arranged on the upper surface 12*b* of the attachment part 12, and a holding part 27*c* that extends downward from an inside edge of the connecting part 27*b* so as to reach the inner surface 12*c* on the inside of the attachment part 12. The holding part 27*c* includes an inclined part 27*d* that is connected with the connecting part 27*b* and that extends toward the attraction part 27*a* and the inner surface 12*c*, and a reverse-inclined part 27*e* that is connected with the inclined part 27*d* and that extends so as to separate from the attraction part 27*a* and the inner surface 12*c*. The sheet metal 27 puts the protruding part 12*j* of the attachment part 12 between the attraction part 27*a*, the holding part 27*c*, and the connecting part 27*b*, which are on the upper edge part, so as to be fixed to the attachment part 12. When the sheet metal 27 is put between the attachment part 12, the attraction part 27*a* and the holding part 27*c* are separated from each other, and the sheet metal 27 is hooked on the outer surface 12*a*, the upper surface 12*b*, and the inner surface 12*c* of the attachment part 12, and the sheet metal 27 is elastically deformed by shape memory and a holding force works on the attachment part 12, so that the sheet metal 27 is fixed to the attachment part 12. Thus, the sheet metal 27 is engaged with the attachment part 12 of the toilet body 3 without using adhesive agent, so that it is possible to easily attach the sheet metal 27 with a small number of working processes. Furthermore, correction is possible when an attachment position between the sheet metal 27 and the toilet body 3 is not appropriate, so that it is possible to provide the flush toilet 1 having a high workability.

The attachment part 12 is fixed so as to be put between the sheet metal 27 by the elastically deformable attraction part 27*a* and the holding part 27*c*, so that it is possible to increase a contact area between the sheet metal 27 and the attachment part 12. When the contact area is increased, a frictional force between the sheet metal 27 and the attachment part 12 is accordingly increased, so that it is possible to prevent the sheet metal 27 from falling off from the attachment part 12.

The attachment part 12 includes concave parts 12i, in each of which the outer surface 12a concaves toward the inside, at respective upper and lower parts in the up-and-down direction of the outer surface 12a. The sheet metal 27 includes concave parts 27i, in each of which the attraction part 27a concaves toward the inside, at respective upper and lower parts in the up-and-down direction of the attraction part 27a. When being attached to the toilet body 3, the sheet metal 27 is arranged such that the concave parts 27i are included in the concave parts 12i in a rear view. When the panel member 9 is attached to the toilet body 3, the magnets 25 of the panel member 9 are positioned at the concave parts 27i. Thus, when the panel member 9 is attached to the toilet body 3, a thickness of each of the magnets 25 in a width direction thereof is able to be reduced, so that it is possible to reduce a protruding amount of the panel member 9 in a width direction thereof.

In a state where the sheet metal 27 is not attached to the toilet body 3, the inclined part 27d of the sheet metal 27 extends from an end part of the connecting part 27b toward the attraction part 27a as illustrated in FIG. 7 by using dashed lines. In FIG. 7, the inclined part 27d before the sheet metal 27 is attached to the toilet body 3 is indicated by using dashed lines, and the inclined part 27d after the sheet metal 27 is attached to the toilet body 3 is indicated by using solid lines.

An angle of the inclined part 27d of the sheet metal 27 after the sheet metal 27 is attached to the attachment part 12 is larger than that before the sheet metal 27 is attached to the protruding part 12j of the attachment part 12, and thus a restoring force for returning to the original shape is generated in the inclined part 27d. Moreover, the attraction part 27a more reliably coheres to the attachment part 12 by the restoring force generated in the inclined part 27d. Thus, it is possible to improve a holding force of the sheet metal 27 with respect to the attachment part 12.

As indicated by using dashed lines illustrated in FIG. 7, in a state before the sheet metal 27 is attached to the attachment part 12, a curvature of a connecting portion between the connecting part 27b and the holding part 27c of the sheet metal 27 is larger than a curvature of a connecting portion between the upper surface 12b and the inner surface 12c of the attachment part 12. Thus, when the sheet metal 27 is attached to the attachment part 12, a connecting portion between the connecting part 27b and the holding part 27c is drawn by the attachment part 12. Thus, it is possible to improve a holding force of the sheet metal 27 with respect to the attachment part 12.

In a state where the sheet metal 27 is attached to the toilet body 3, the inclined part 27d is also inclined with respect to the inner surface 12c. Herein, a part that is in contact with the attachment part 12 at a leading end of the inclined part 27d may be referred to as a contact part 27f.

Thus, a force applied to the contact part 27f from the attachment part 12 generates a moment force in the inclined part 27d, the connecting part 27b, and the attraction part 27a from the contact part 27f as a starting point, so that the attraction part 27a and the attachment part 12 more reliably cohere to each other. Thus, it is possible to improve a holding force of the sheet metal 27 with respect to the attachment part 12.

Next, attachment between the sheet metal 27 and a lower portion of the attachment part 12 will be explained with reference to FIGS. 4 and 8. FIG. 8 is a rear view illustrating a periphery of the sheet metal 27 and a lower portion of the attachment part 12 in the flush toilet 1 according to the embodiment.

To an end part on an opposite side of an end part connected with the connecting part 27b in a lower portion of the sheet metal 27, a fixing part 27h is provided that extends from the attraction part 27a toward the inside so as to cover a lower edge part of a back surface 12f of the attachment part 12. The fixing part 27h is formed in L-shaped in a top view, and the outer surface 12a and the back surface 12f of the attachment part 12 are surrounded by two surfaces of the fixing part 27h that are formed in L-shaped while being in contact therewith.

The fixing part 27h includes a protruding part 27j that protrudes backward from a lower edge thereof. A screw hole 27k is formed in the protruding part 27j. After a screw is inserted into the screw hole 27k, the fixing part 27h is fixed to a bottom part 3a that is formed in a rear edge of the toilet body 3. Thus, the fixing part 27h is attached to the toilet body 3.

Thus, both of two end parts of the sheet metal 27 go into a state where the two end parts are fixed to the toilet body 3, so that even a portion of the sheet metal 27 that is separate from the connecting part 27b is able to cohere to the attachment part 12. Moreover, the number of fixed parts is set to two, so that stress applied to the sheet metal 27 is able to be dispersed.

Figure 9:
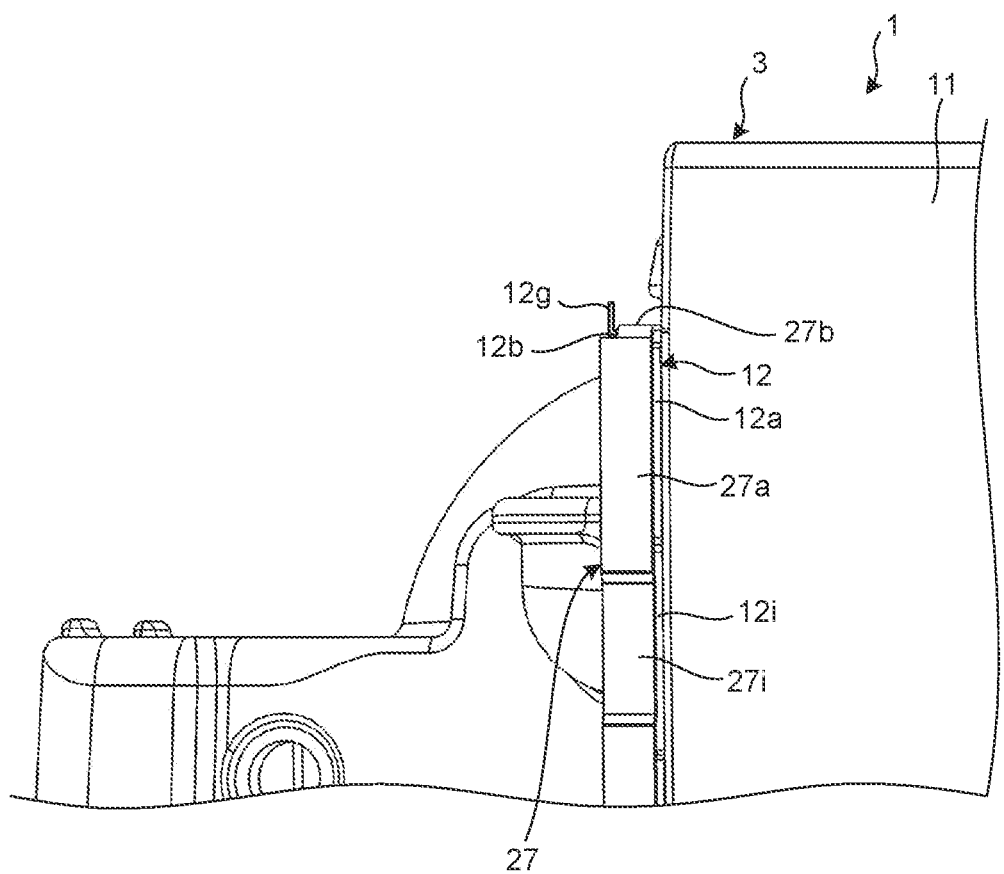
FIG. 9 is a side view illustrating a periphery of an upper surface of an attachment part in a flush toilet according to a modification.

As illustrated in FIG. 9, in the flush toilet 1 according to a modification, the attachment part 12 includes a rib part 12g that extends upward from a rear edge of the upper surface 12b of the attachment part 12. FIG. 9 is a side view illustrating a periphery of the upper surface 12b of the attachment part 12 in the flush toilet 1 according to the modification.

The connecting part 27b covers a front portion of the upper surface 12b, and the rib part 12g extends from a portion of the upper surface 12b that is behind the connecting part 27b. Thus, when the sheet metal 27 moves in a direction perpendicular to the attachment part 12, the connecting part 27b is in contact with the rib part 12g, so that it is possible to prevent the sheet metal 27 from falling off from the toilet body 3. Moreover, the rib part 12g protrudes upward from the upper surface 12b, the rib part 12g is not contact with the panel member 9, the panel member 9 does not swell in a width direction of the toilet body 3, and thus a level difference is not generated between the panel member 9 and the toilet body 3.

Note that the rib part 12g extends not limitedly upward from the upper surface 12b, may extend toward the outside from a rear portion of the outer surface 12a, or may extend toward the inside from the inner surface 12c.

In accordance with a flush toilet according to the present disclosure, it is possible to easily attach a sheet metal to a toilet body without using adhesive agent.

A flush toilet according to one aspect of embodiments includes: a toilet body including a bowl part that receives waste; a function unit that is arranged in a rear portion of the toilet body; a panel member that covers a side surface of the function unit; a magnet that is provided to the panel member; and a magnetic material that is provided to an attachment part of the toilet body, wherein the magnetic material is elastically deformable, and is attached to the attachment part to put the attachment part therebetween.

According to such a configuration, a magnetic material is engaged with an attachment part of a toilet body without using adhesive agent, so that the number of working processes is able to be small and the magnetic material is able to be easily attached. Thus, correction is possible when an attachment position of the magnetic material to the toilet body is not desirable, so that it is possible to provide a flush toilet having a high workability.

The magnetic material includes: an attraction part that is attracted by the magnet; a holding part that is opposite to the attraction part via the attachment part; and a connecting part that connects the attraction part and the holding part with each other.

According to such a configuration, an attachment part is fixed between the magnetic material by the elastically-deformable attraction part and the holding part, so that it is possible to increase a contact area between the magnetic material and the attachment part. When the contact area is increased, a frictional force between the magnetic material and the attachment part is accordingly increased, so that it is possible to prevent the magnetic material from falling off from the attachment part.

The holding part includes: an inclined part that extends toward the attraction part from an end part thereof on a side of the connecting part in a state where the magnetic material is not attached to the toilet body.

According to such a configuration, after the magnetic material is attached to the attachment part, an angle between the connecting part and the inclined part is larger than that before the magnetic material is attached to the attachment part, and thus a restoring force for returning to the original shape is generated in the inclined part. The attraction part more reliably coheres to the attachment part by the restoring force generated by the inclined part. Thus, it is possible to improve a holding force of the magnetic material with respect to the attachment part.

The holding part further includes: a contact part that is provided to a leading end of the inclined part to be in contact with the attachment part, and the inclined part extends toward the attraction part from the end part thereof on the side of the connecting part in a state where the magnetic material is attached to the toilet body.

According to such a configuration, a force applied to the contact part from the attachment part generates a moment force in the inclined part, the connecting part, and the attraction part from the contact part as a starting point, so that the attraction part and the attachment part more reliably cohere to each other. Thus, it is possible to improve a holding force of the magnetic material with respect to the attachment part.

The magnetic material further includes: a fixing part that is attached to the toilet body in an end part that is opposite to an end part connected with the connecting part.

According to such a configuration, end parts of the magnetic material go into a state where both of which are fixed to the toilet body, and thus even a part away from the connecting part in the magnetic material is able to cohere to the attachment part. Furthermore, the number of the fixed parts is set to two, and thus stress applied to the magnetic material is able to be dispersed.

The toilet body further includes: a rib part that protrudes from the attachment part to regulate a backward movement of the magnetic material.

According to such a configuration, when the magnetic material moves backward due to an internal force or an external force, it is possible to prevent the magnetic material from falling off from the toilet body.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A flush toilet comprising:
    a toilet body including a bowl part that receives waste;
    a function unit that is arranged in a rear portion of the toilet body;
    a panel member that covers a side surface of the function unit;
    a magnet that is provided to the panel member; and
    a magnetic material that is provided to an attachment part of the toilet body, wherein
    the magnetic material is elastically deformable, and is attached to the attachment part to put the attachment part therebetween.

2. The flush toilet according to claim 1, wherein
    the magnetic material includes:
        an attraction part that is attracted by the magnet;
        a holding part that is opposite to the attraction part via the attachment part; and
        a connecting part that connects the attraction part and the holding part with each other.

3. The flush toilet according to claim 2, wherein
    the holding part includes:
        an inclined part that extends toward the attraction part from an end part thereof on a side of the connecting part in a state where the magnetic material is not attached to the toilet body.

4. The flush toilet according to claim 3, wherein
    the holding part further includes:
        a contact part that is provided to a leading end of the inclined part to be in contact with the attachment part, and
    the inclined part extends toward the attraction part from the end part thereof on the side of the connecting part in a state where the magnetic material is attached to the toilet body.

5. The flush toilet according to claim 2, wherein
    the magnetic material further includes:
        a fixing part that is attached to the toilet body in an end part that is opposite to an end part connected with the connecting part.

6. The flush toilet according to claim 1, wherein
    the toilet body further includes:
        a rib part that protrudes from the attachment part to regulate a backward movement of the magnetic material.

* * * * *